United States Patent
Iriguchi et al.

(10) Patent No.: US 9,513,621 B2
(45) Date of Patent: Dec. 6, 2016

(54) MANIPULATION MONITORING DEVICE AND MANIPULATION MONITORING METHOD

(75) Inventors: Hiroshi Iriguchi, Tokyo (JP); Mihoko Tanaka, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 361 days.

(21) Appl. No.: 13/425,628

(22) Filed: Mar. 21, 2012

(65) Prior Publication Data

US 2012/0242629 A1   Sep. 27, 2012

(30) Foreign Application Priority Data

Mar. 22, 2011   (JP) .................................. 2011-062759

(51) Int. Cl.
*G05B 19/409*   (2006.01)
(52) U.S. Cl.
CPC ... *G05B 19/409* (2013.01); *G05B 2219/31472* (2013.01); *G05B 2219/36133* (2013.01); *G05B 2219/36146* (2013.01)
(58) Field of Classification Search
None
See application file for complete search history.

(56) References Cited

U.S. PATENT DOCUMENTS

| | | | |
|---|---|---|---|
| 6,983,422 B1 | 1/2006 | Gunther | |
| 2008/0172136 A1* | 7/2008 | Kataoka | .......................... 700/83 |
| 2010/0182248 A1* | 7/2010 | Chun | ...................... G06F 3/041 345/173 |
| 2011/0072382 A1* | 3/2011 | Caldwell et al. | ............. 715/772 |

(Continued)

FOREIGN PATENT DOCUMENTS

| | | | |
|---|---|---|---|
| EP | 2503419 A2 | * | 9/2012 |
| JP | 61-15539 A | | 1/1986 |

(Continued)

OTHER PUBLICATIONS

Japanese Office Action dated Jan. 22, 2013, issued in corresponding Japanese Patent Application No. 2011-062759, w/ English translation.

*Primary Examiner* — David D Davis
(74) *Attorney, Agent, or Firm* — Westerman, Hattori, Daniels & Adrian, LLP

(57) ABSTRACT

A manipulation monitoring device includes a first storage unit that stores screen information of a manipulation monitoring screen prepared for each manipulation monitoring area of a plant, a second storage unit that stores relevance information indicating logical relevance of process elements constituting a process realized in the plant, a display unit that displays the manipulation monitoring screen according to the screen information stored in the first storage unit as a first manipulation monitoring screen, a search unit that searches the first storage unit based on the relevance information stored in the second storage unit to obtain the screen information related to the first manipulation monitoring screen displayed on the display unit, and a display control unit that performs display control to cause a second manipulation monitoring screen according to the screen information obtained by the search unit to be displayed on the display unit with the first manipulation monitoring screen.

14 Claims, 11 Drawing Sheets

(56) References Cited

U.S. PATENT DOCUMENTS

2012/0319971 A1\* 12/2012 Eguchi ................ G06F 3/04883
                                                                         345/173

FOREIGN PATENT DOCUMENTS

| JP | 1-263804 A | 10/1989 |
|----|------------|---------|
| JP | 5-53641 A | 3/1993 |
| JP | 2008-171166 A | 7/2008 |
| JP | 2009-146208 A | 7/2009 |
| JP | 2010-231291 A | 10/2010 |

\* cited by examiner

FIG. 4

| SCREEN ID | NAME | ID LIST | DISPLAY METHOD |
|---|---|---|---|
| 1 | GRAPHIC SCREEN 1 | V1, R1, T1, T2, T3 | T1={ICON X1, DISPLAY POSITION(x1,y1), LINK NO.3} |
| 2 | GRAPHIC SCREEN 2 | V11, R11, T11 | ..... |
| 3 | GRAPHIC SCREEN 3 | V21, V22, V23, R21 | ..... |
| ..... | ..... | ..... | ..... |

|  | F21 | F22 | F23 | F24 |
|---|---|---|---|---|
|  | ELEMENT ID | NAME | POSITION ON LOGICAL DIAGRAM | CONNECTION RELATIONSHIP INFORMATION |
| K1 | R1 | REACTOR 1 | X11, Y11 | V1→INPUT:PIPE<br>V2→INPUT:PIPE<br>V3→INPUT:PIPE |
| K2 | R2 | REACTOR 2 | X21, Y21 | ..... |
| K3 | R3 | REACTOR 3 | X31, Y31 | ..... |
| ⋮ | ⋮ | ⋮ | ⋮ | ⋮ |

MANIPULATION MONITORING DEVICE AND MANIPULATION MONITORING METHOD

BACKGROUND OF THE INVENTION

Field of the Invention

The present invention relates to a manipulation monitoring device and a manipulation monitoring method that perform a control operation and monitoring of a plant.

Priority is claimed on Japanese Patent Application No. 2011-062759, filed Mar. 22, 2011, the content of which is incorporated herein by reference.

Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

A distributed control system (DCS), in which an in-situ device called a field device (a measuring instrument or a manipulator) and a manipulation monitoring device for performing control and monitoring of the field device are connected to each other, for example, via a communication bus, has been conventionally built to realize an advanced automatic operation in a plant. In this distributed control system, a current measurement value, a target value, an alarm value and the like of a process realized in the plant are displayed on the manipulation monitoring device, and control of the field device is performed by the manipulation monitoring device based on an instruction from an operator (an operator of a plant) referencing such a display.

The display of the measurement value, the target value or the like of the process in the manipulation monitoring device is performed for each manipulation monitoring screen (graphic screen) prepared in advance. Here, the graphic screen refers to a screen that is prepared for each manipulation monitoring area set in a plant and graphically displays manipulation monitoring targets (e.g., a valve, a reactor or a tank) arranged in the manipulation monitoring area. Further, the manipulation monitoring area is often set based on an individual process in a series of processes realized in the plant.

Here, when the control operation and monitoring of the plant are performed, processes before and after any process in a series of processes realized in the plant may need to be simultaneously monitored or a plurality of processes may need to be globally monitored. In such a case, the operator should manipulate the manipulation monitoring device to cause a plurality of graphic screens to be displayed on the manipulation monitoring device, and perform monitoring while switching the respective graphic screens displayed on the manipulation monitoring device. Japanese Unexamined Patent Application, First Publication No. 2008-171166 discloses a conventional manipulation monitoring device that allows an intuitive manipulation and easy reuse of information.

Incidentally, the conventional manipulation monitoring device is capable of displaying the graphic screen based on the instruction of the operator as described above, but the operator should manually instruct the graphic screen that is to be displayed and manually adjust a display position or a size of the graphic screen. That is, in the conventional manipulation monitoring device, a new graphic screen instructed by the operator is displayed without taking content, a display position, or the size of a currently displayed graphic screen into consideration.

Accordingly, in order to simultaneously monitor preceding and subsequent processes or globally monitor a plurality of processes using the conventional manipulation monitoring device, the operator must manually adjust the display position or the size of the graphic screen for each process in consideration of a relationship between the processes. Thus, in the conventional manipulation monitoring device, monitoring in consideration of a plurality of processes requires a very complex task, degrading convenience and task efficiency. Further, when such a complicated task is forced, it takes a long time to find causes of problems generated in the plant and thus response is delayed.

SUMMARY

The present invention provides a manipulation monitoring device and a manipulation monitoring method capable of easily performing monitoring in consideration of a plurality of processes.

A manipulation monitoring device may include: a first storage unit that stores screen information of a manipulation monitoring screen prepared for each manipulation monitoring area of a plant; a second storage unit that stores relevance information indicating logical relevance of process elements constituting a process realized in the plant; a display unit that displays the manipulation monitoring screen according to the screen information, which has been stored in the first storage unit, as a first manipulation monitoring screen; a search unit that searches the first storage unit based on the relevance information, which has been stored in the second storage unit, to obtain the screen information related to the first manipulation monitoring screen displayed on the display unit; and a display control unit that performs display control to cause a second manipulation monitoring screen according to the screen information obtained by the search unit to be displayed on the display unit together with the first manipulation monitoring screen.

The manipulation monitoring device may further include: an input unit that receives a manipulation instruction for the first manipulation monitoring screen; and a detection unit that detects a blank space area of the display unit in which the first manipulation monitoring screen becomes undisplayed, based on the manipulation instruction received by the input unit. The search unit may search the first storage unit based on a detection result from the detection unit, as well as the relevance information, to obtain the screen information related to the first manipulation monitoring screen.

If a plurality of screen information related to the first manipulation monitoring screen is obtained by the search unit, then the display control unit may perform display control to compose manipulation monitoring screens according to the screen information and cause the composed screen to be displayed as the second manipulation monitoring screen on the display unit.

If a plurality of screen information related to the first manipulation monitoring screen is obtained by the search unit, then the display control unit may perform display control to display simple information for the manipulation monitoring screens according to the screen information and cause the manipulation monitoring screen selected by a selection instruction for the simple information to be displayed as the second manipulation monitoring screen on the display unit.

The display control unit may perform display control to change a display position of the first manipulation monitoring screen on the display unit based on the manipulation instruction received by the input unit and cause the second manipulation monitoring screen to be displayed in the blank space area of the display unit detected by the detection unit.

The display control unit may display simple information for the second manipulation monitoring screen without changing a display position of the first manipulation monitoring screen on the display unit.

If a plurality of screen information related to the first manipulation monitoring screen is obtained by the search unit, then the display control unit may perform display control to compose manipulation monitoring screens according to the screen information and cause the composed screen to be displayed as the second manipulation monitoring screen on the display unit.

If a plurality of screen information related to the first manipulation monitoring screen is obtained by the search unit, then the display control unit may perform display control to display simple information for the manipulation monitoring screens according to the screen information and cause the manipulation monitoring screen selected by a selection instruction for the simple information to be displayed as the second manipulation monitoring screen on the display unit.

If a plurality of screen information related to the first manipulation monitoring screen is obtained by the search unit, then the display control unit may perform display control to compose manipulation monitoring screens according to the screen information and cause the composed screen to be displayed as the second manipulation monitoring screen on the display unit.

If a plurality of screen information related to the first manipulation monitoring screen is obtained by the search unit, then the display control unit may perform display control to display simple information for the manipulation monitoring screens according to the screen information and cause the manipulation monitoring screen selected by a selection instruction for the simple information to be displayed as the second manipulation monitoring screen on the display unit.

If a plurality of screen information related to the first manipulation monitoring screen is obtained by the search unit, then the display control unit may perform display control to compose manipulation monitoring screens according to the screen information and cause the composed screen to be displayed as the second manipulation monitoring screen on the display unit.

If a plurality of screen information related to the first manipulation monitoring screen is obtained by the search unit, then the display control unit may perform display control to display simple information for the manipulation monitoring screens according to the screen information and cause the manipulation monitoring screen selected by a selection instruction for the simple information to be displayed as the second manipulation monitoring screen on the display unit.

A manipulation monitoring method of performing control operation and monitoring of a plant may include: displaying a manipulation monitoring screen according to screen information stored in a first storage unit as a first manipulation monitoring screen on a display unit, the first storage unit being prepared for each manipulation monitoring area of the plant to store the screen information of the manipulation monitoring screen; searching the first storage unit based on relevance information stored in a second storage unit to obtain the screen information related to the first manipulation monitoring screen displayed on the display unit, the second storage unit storing the relevance information indicating logical relevance of process elements constituting a process realized in the plant; and displaying a second manipulation monitoring screen according to the screen information obtained by the searching on the display unit together with the first manipulation monitoring screen.

The manipulation monitoring method may further include: receiving a manipulation instruction for the first manipulation monitoring screen; detecting a blank space area of the display unit in which the first manipulation monitoring screen becomes undisplayed, based on the received manipulation instruction; and searching the first storage unit based on a detection result for the blank space area, as well as the relevance information, to obtain the screen information related to the first manipulation monitoring screen.

The manipulation monitoring method may further include: changing a display position of the first manipulation monitoring screen on the display unit based on the manipulation instruction; and displaying the second manipulation monitoring screen in the blank space area that has been detected.

The manipulation monitoring method may further include: displaying simple information for the second manipulation monitoring screen without changing a display position of the first manipulation monitoring screen on the display unit.

The manipulation monitoring method may further include: composing manipulation monitoring screens according to the screen information to display the composed screen as the second manipulation monitoring screen on the display unit if a plurality of screen information related to the first manipulation monitoring screen is obtained.

The manipulation monitoring method may further include: displaying simple information for the manipulation monitoring screens based on the screen information on the display unit and displaying the manipulation monitoring screen selected by a selection instruction for the simple information as the second manipulation monitoring screen on the display unit if a plurality of screen information related to the first manipulation monitoring screen is obtained.

According to the present invention, it is possible to easily perform monitoring in consideration of a plurality of processes since the first storage unit is searched to acquire screen information related to the first manipulation monitoring screen displayed on the display unit based on the relevance information stored in the second storage unit, and the second manipulation monitoring screen based on the acquired screen information is displayed on the display unit together with the first manipulation monitoring screen.

BRIEF DESCRIPTION OF THE DRAWINGS

The above features and advantages of the present invention will be more apparent from the following description of certain preferred embodiments taken in conjunction with the accompanying drawings, in which:

FIG. 4 is a diagram illustrating a concrete example of the graphic screen DB in accordance with the first preferred embodiment of the present invention;

FIG. 5 is a diagram illustrating a concrete example of the process configuration DB in accordance with the first preferred embodiment of the present invention;

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

Figure 1:
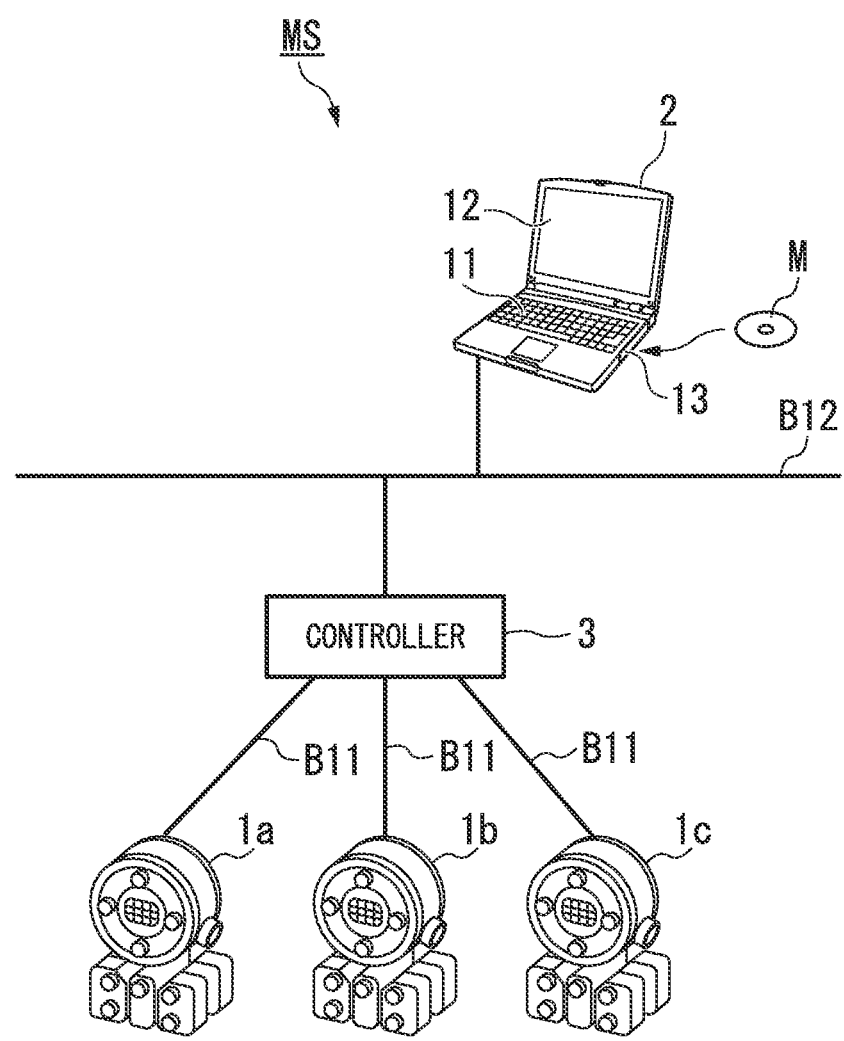
FIG. 1 is a simplified block diagram illustrating an overall configuration of a manipulation monitoring system in which the manipulation monitoring device in accordance with a first preferred embodiment of the present invention is used.

Hereinafter, a manipulation monitoring device and a manipulation monitoring method in accordance with a first preferred embodiment of the present invention will be described in detail with reference to the accompanying drawings. FIG. 1 is a simplified block diagram illustrating an overall configuration of a manipulation monitoring system in which the manipulation monitoring device in accordance with the first preferred embodiment of the present invention is used. As shown in FIG. 1, the manipulation monitoring system MS includes field devices 1a to 1c, a manipulation monitoring device 2, and a controller 3. The controller 3 performs control of a process using the field devices 1a to 1c and the manipulation monitoring device 2 performs monitoring of the field devices 1a to 1c. In FIG. 1, for simplicity of explanation, three field devices 1a to 1c have been shown, but the number of field devices may be more or less according to a scale of a plant.

The field devices 1a to 1c are, for example, sensor devices such as flowmeters or temperature sensors, valve devices such as flow control valves or on-off valves, actuator devices such as fans or motors, or other devices installed in the field of the plant. The processes using the field devices 1a to 1c are controlled based on control data transmitted from the controller 3. Further, measurement data obtained by the field devices 1a to 1c is collected by the controller 3 and sent from the controller 3 to the manipulation monitoring device 2.

A communication bus B11 is a wired communication bus provided in the plant, and connects the field devices 1a to 1c with the controller 3. For example, a serial communication bus defined in a Foundation Field bus (registered trademark), a HART (Highway Addressable Remote Transducer: registered trademark), a PROFIBUS (registered trademark), a BRAIN or the like may be used as the communication bus B11. Further, a communication bus B12 is a wired communication bus such as Ethernet (registered trademark) and connects the controller 3 with the manipulation monitoring device 2.

The manipulation monitoring device 2 performs the monitoring of the field devices 1a to 1c while performing transmission and reception of various parameters used in the field devices 1a to 1c to and from the controller 3. For example, the manipulation monitoring device 2 acquires a parameter set in the field devices 1a to 1c to recognize a current measurement condition, and causes the controller 3 to set a new parameter in the field devices 1a to 1c, for example, in order to change the measurement condition. Further, the manipulation monitoring device 2 is manipulated by an operator (an operator of the plant). The controller 3 performs the control of the process using the field devices 1a to 1c.

The manipulation monitoring device 2 is realized, for example, by a note type or a desktop type personal computer including an input device 11 (input unit) such as a keyboard or a pointing device, a display device 12 (display unit) such as a liquid crystal display device, a drive device 13, and the like. The drive device 13 is, for example, a device for reading data recorded in a computer-readable recording medium M, such as a CD-ROM or a DVD (registered trademark)-ROM. Further, functions of the manipulation monitoring device 2 (a function of performing the monitoring of the field devices 1a to 1c and a function of performing display control for the display device 12) are realized by software as a program recorded on the recording medium M is read by the drive device 13 and installed in the manipulation monitoring device 2.

Figure 2:
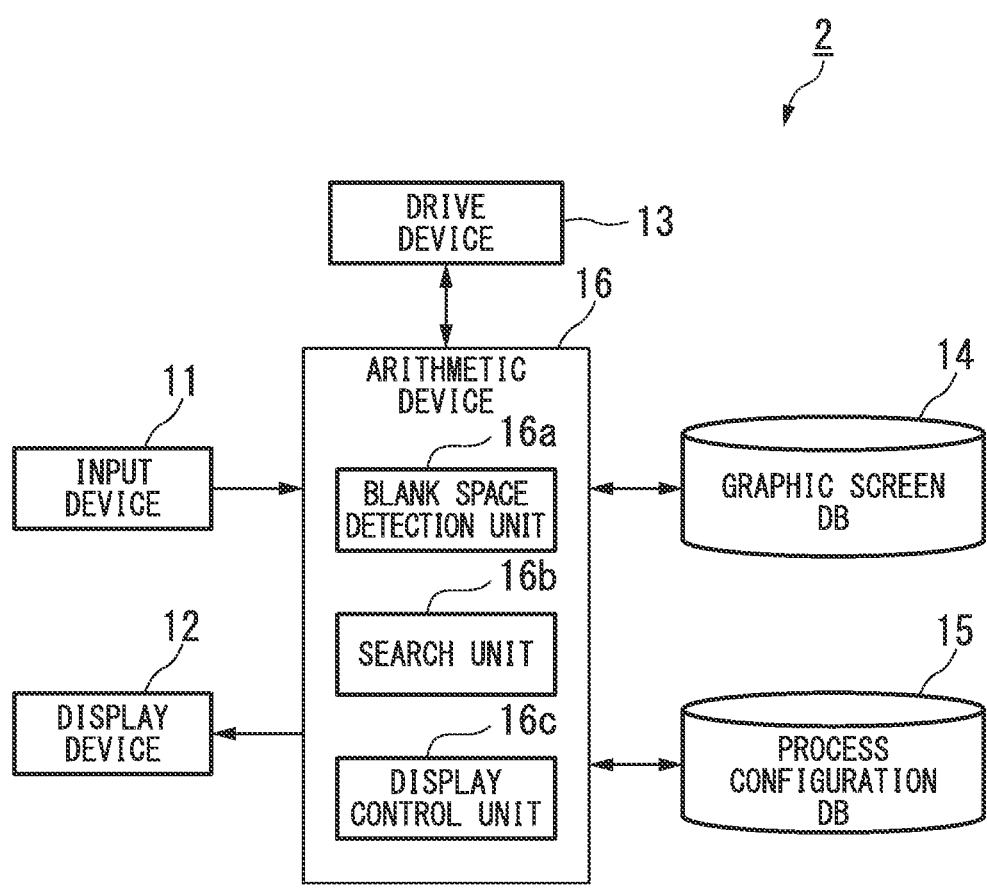
FIG. 2 is a block diagram illustrating a configuration of principal units of the manipulation monitoring device in accordance with the first preferred embodiment of the present invention.

FIG. 2 is a block diagram illustrating a configuration of principal units of the manipulation monitoring device in accordance with the first preferred embodiment of the present invention. As shown in FIG. 2, the manipulation monitoring device 2 includes a graphic screen database (DB) 14 (a first storage unit), a process configuration DB 15 (a second storage unit), and an arithmetic device 16, in addition to the input device 11, the display device 12 and the drive device 13 described above. The graphic screen DB 14 and the process configuration DB 15 are realized by, for example, an external storage device such as a hard disk, and the arithmetic device 16 is realized by a CPU (central processing unit).

The graphic screen DB 14 stores screen information of a manipulation monitoring screen (graphic screen) prepared in each manipulation monitoring area of the plant. Here, the graphic screen refers to a screen that graphically displays manipulation monitoring targets (e.g., a valve, a reactor and a tank) arranged in the manipulation monitoring area of the plant. Further, the manipulation monitoring area of the plant is often set based on an individual process in a series of processes realized in the plant.

The process configuration DB 15 stores relevance information indicating logical relevance of process elements that constitute the process realized in the plant. Here, the process elements refer to elements arranged in the plant with a prescribed relevance and cooperating with each other in operation to realize the process. Examples of the process element include a valve, a reactor, a pipe, and the like.

Figure 3:
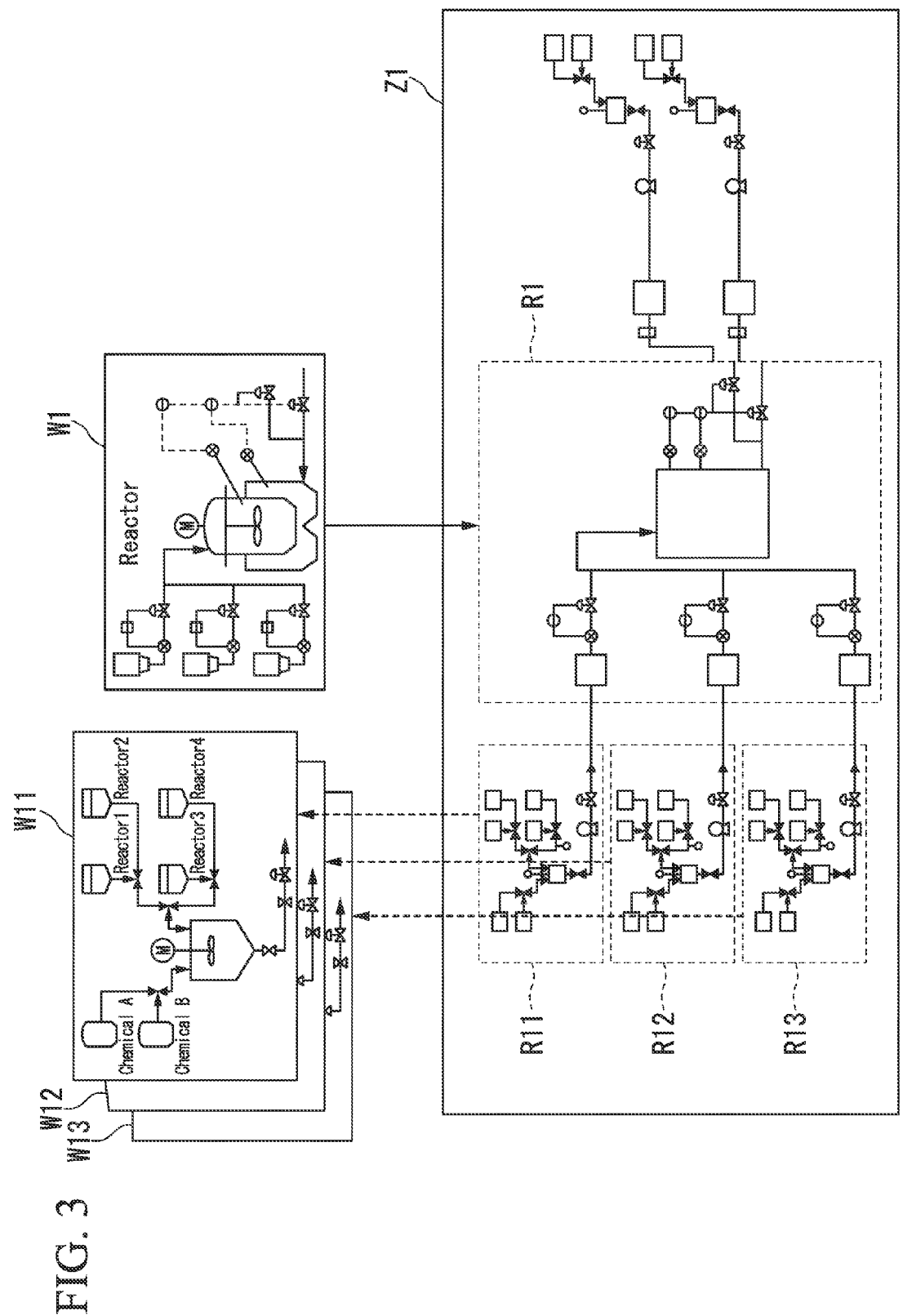
FIG. 3 is a diagram illustrating a relationship between the graphic screen DB and the process configuration DB in accordance with the first preferred embodiment of the present invention.

FIG. 3 is a diagram illustrating a relationship between the graphic screen DB and the process configuration DB in accordance with the first preferred embodiment of the present invention. In FIG. 3, a diagram shown inside a frame indicated by a reference numeral Z1 is a diagram illustrating a logic configuration of the series of processes realized in the plant. Referring to this diagram, the logic configuration diagram of the processes is found to be the same as a piping diagram of the plant. Information indicating logical relevance of the process elements included in the logic configuration diagram is stored in the process configuration DB 15 as the relevance information.

Further, rectangular areas R1 and R11 to R13 shown inside the frame Z1 in FIG. 3 are the manipulation monitoring areas of the plant, and screens W1 and W11 to W13 shown outside the frame Z1 are graphic screens prepared in the respective manipulation monitoring areas R1 and R11 to R13. Here, it is found that a connection relationship between the process elements in the areas R1 and R11 to R13 of the logic configuration diagram shown inside the frame Z1 is similar to a connection relationship between manipulation monitoring targets displayed on the graphic screens W1 and W11 to W13 from a comparison therebetween. Screen information of the above graphic screens W1 and W11 to W13 is stored in the graphic screen DB 14.

Next, concrete examples of the graphic screen DB and the process configuration DB will be sequentially described. FIG. 4 is a diagram illustrating a concrete example of the graphic screen DB in accordance with the first preferred embodiment of the present invention. In FIG. 4, the screen information stored in the graphic screen DB 14 is shown in a table format in order to facilitate understanding, but the data format is optional. As shown in FIG. 4, each of screen information G1, G2, G3, . . . stored in the graphic screen DB 14 includes four fields F11 to F14.

The field F11 is a field in which a screen ID that is information for identifying each graphic screen is stored. The field F12 is a field in which the name of each graphic screen is stored. The field F13 is a field in which a list of IDs assigned to the respective manipulation monitoring targets displayed on the graphic screen (an ID list) is stored. For example, an ID "V1" of a valve displayed on the graphic screen, an ID "R1" of a reactor, and IDs "T1" to "T3" of tanks are stored as an ID list in the field F13 of the screen information G1.

The field F14 is a field in which information indicating a method of displaying each manipulation monitoring target displayed on the graphic screen is stored. Specifically, information indicating an icon used to display the manipulation monitoring target and a display position of the manipulation monitoring target are stored. Further, when the graphic screen related to the manipulation monitoring target is present, a screen ID for specifying the graphic screen is stored as link information. Hereinafter, a manipulation monitoring target for which the link information has been stored is referred to as "link object."

In the example shown in FIG. 4, information T1={icon X1, display position (x1, y1), link NO.3} is stored in the field F14 of the screen information G1. The information indicates that a tank assigned the ID "T1" is to be displayed using the icon "X1" in the position (x1, y1) of the graphic screen and a graphic screen specified by the screen ID "3" is related to this tank.

In the example shown in FIG. 4, for simplicity of explanation, only the information for the tank assigned the ID "T1" is shown, but information for the IDs stored in the field F13 is stored in the field F14. That is, information for IDs "V1," "R1," "T2" and "T3" is stored in the field F14 of the screen information G1, in addition to the information for the ID "T1."

FIG. 5 is a diagram illustrating a concrete example of the process configuration DB in accordance with the first preferred embodiment of the present invention. In FIG. 5, relevance information stored in the process configuration DB 15 is shown in a table format, similar to the graphic screen DB 14 shown in FIG. 4, but the data format is optional. As shown in FIG. 5, each of relevance information K1, K2, K3, . . . stored in the process configuration DB 15 includes four fields F21 to F24.

The field F21 is a field in which an element ID that is information for identifying each of process elements constituting the process is stored. The field F22 is a field in which the name given to each process element is stored. The field F23 is a field in which information indicating the position of the process element in the logic configuration diagram of the process shown in the frame Z1 of FIG. 3 is stored. The field F24 is a field in which information indicating a connection relationship with another process element (connection relationship information) is stored.

As shown in FIG. 2, the arithmetic device 16 performs the monitoring of the field devices 1a to 1c and also performs the display control for the display device 12. A blank space detection unit 16a, a search unit 16b, and a display control unit 16c are realized in the arithmetic device 16 by reading a program recorded in the recording medium M shown in FIG. 1 by the drive device 13 and installing the program.

When a manipulation instruction to change a manipulation monitoring range displayed on the display device 12 is input from the input device 11, the blank space detection unit 16a detects a blank space (blank space area) created in the display device 12. For example, when the operator makes a manipulation to move (slide) the graphic screen displayed on the display device 12 to the right (a manipulation to drag in a right direction), the blank space detection unit 16 detects the blank space created in a left end portion of the display device 12 when the graphic screen displayed on the display device 12 is slid to the right.

The search unit 16b searches the graphic screen DB 14 to obtain screen information of a graphic screen to be displayed in the blank space detected by the blank space detection unit 16a. Here, methods for the search performed by the search unit 16b include the following first and second search methods.

(1) First Search Method

A search method of searching the graphic screen DB 14 using the link information described above.

(2) Second Search Method

A search method of searching the graphic screen DB 14 using relevance information stored in the process configuration DB 15.

The first search method is a search method of searching screen information of a graphic screen that is associated with the graphic screen displayed on the display device 12 by link information in advance. For example, when a drag manipulation to drag a graphic screen displayed on the display device 12 is made while designating a specific manipulation monitoring target in the graphic screen and if there is link information for the designated manipulation monitoring target, the graphic screen DB 14 is searched using the first search method.

The second search method is a search method of searching screen information of a graphic screen estimated to be displayed in the blank space using the relevance information stored in the process configuration DB 15. For example, when a drag manipulation to drag the graphic screen displayed on the display device 12 is made and if there is no link information for the graphic screen, the graphic screen DB 14 is searched using the second search method.

Here, the graphic screen W1 of the manipulation monitoring area R1 in the logic configuration diagram of the process shown in the frame Z1 of FIG. 3 is assumed to have been displayed on the display device 12. If a drag manipulation to drag the graphic screen W1 in a right direction is made, the graphic screen to be displayed in the blank space created by the drag manipulation is estimated to be the graphic screen (e.g., the graphic screen W11) for a portion (e.g., the manipulation monitoring area R11) at the left of the manipulation monitoring area R1, from the logic configuration diagram of the process. As described above, in the second search method, search information of the graphic screen estimated to be displayed is searched for using the relevance information stored in the process configuration DB 15.

The display control unit 16*c* performs the display control of the graphic screen for the display device 12 based on the search results of the blank space detection unit 16*a* and the search unit 16*b*. Specifically, the display control unit 16*c* performs the display control to cause a new graphic screen (a second manipulation monitoring screen) according to the screen information obtained by the search unit 16*b* to be displayed together with a graphic screen (a first manipulation monitoring screen) already displayed on the display device 12.

For example, the display control unit 16*c* performs display control to change a display position of the graphic screen already displayed on the display device 12 based on a manipulation instruction of the operator and to cause a new graphic screen to be displayed in the blank space created due to the change of the display position. Alternatively, the display control unit 16*c* performs display control to display a thumbnail (simple information) obtained by scaling down the new graphic screen without changing the display position of the graphic screen already displayed on the display device 12.

Further, when a plurality of screen information is obtained through the search of the search unit 16*b*, the display control unit 16*c* performs display control to compose graphic screens according to the screen information and cause the composed screen to be displayed on the display unit 12. Here, the display control unit 16*c* composes thumbnails obtained by scaling down the respective graphic screens or composes information indicating the names of the graphic screens in a list, and displays the composed screen.

Figure 6:
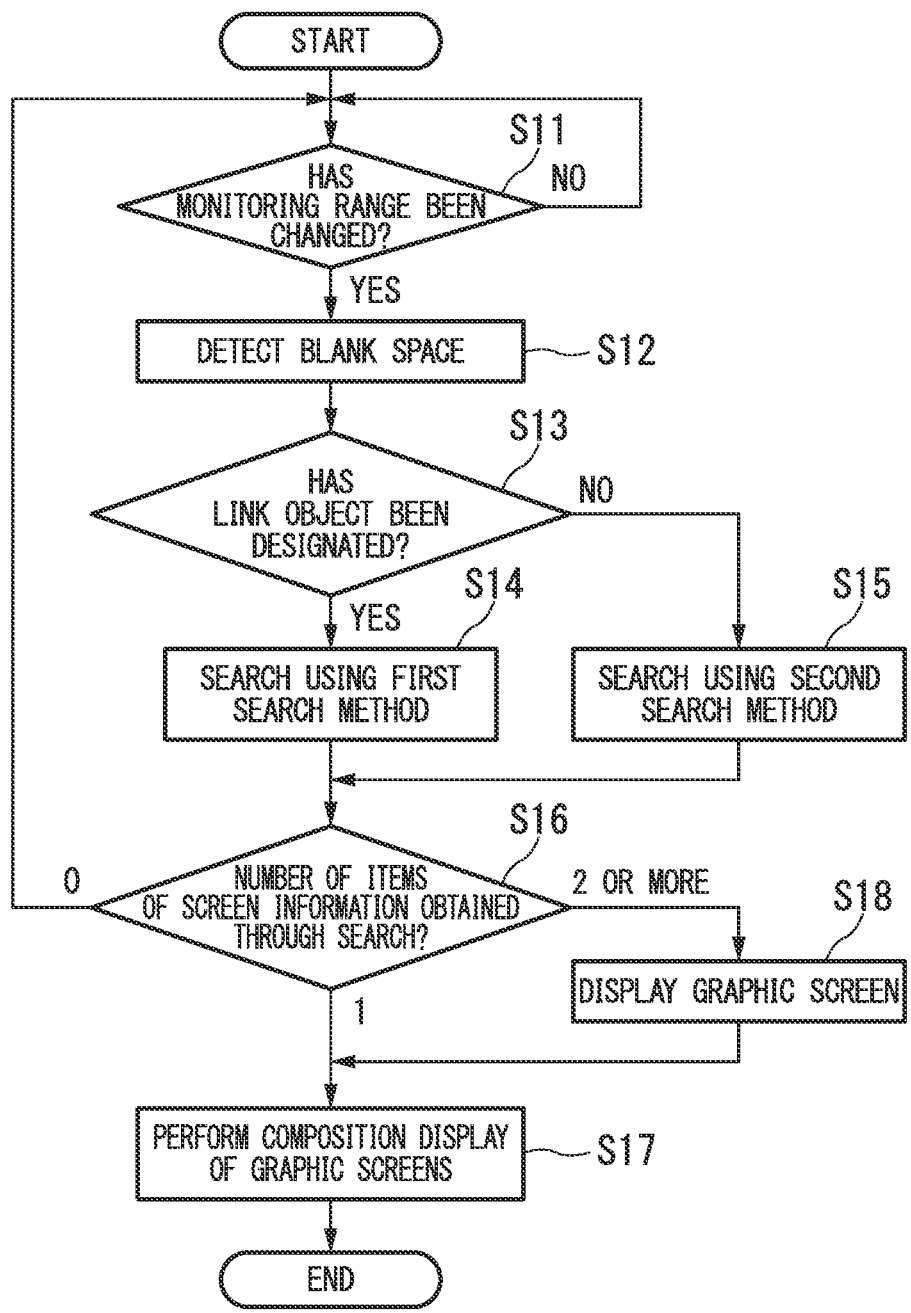
FIG. 6 is a flowchart illustrating a process performed in the manipulation monitoring device in accordance with the first preferred embodiment of the present invention.
Figure 7A:
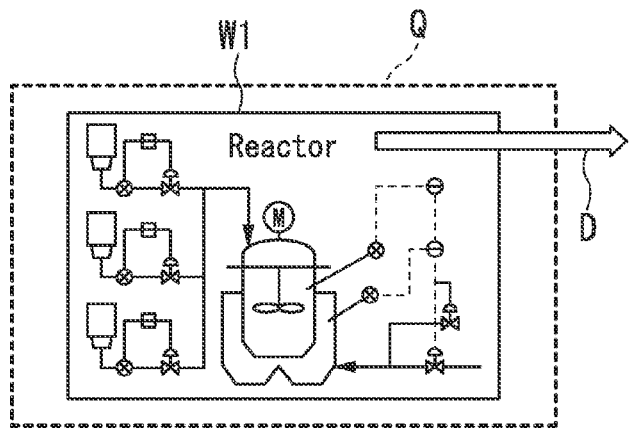
FIGS. 7A, 7B and 7C are diagrams illustrating the process performed in the manipulation monitoring device in accordance with the first preferred embodiment of the present invention.
Figure 7B:
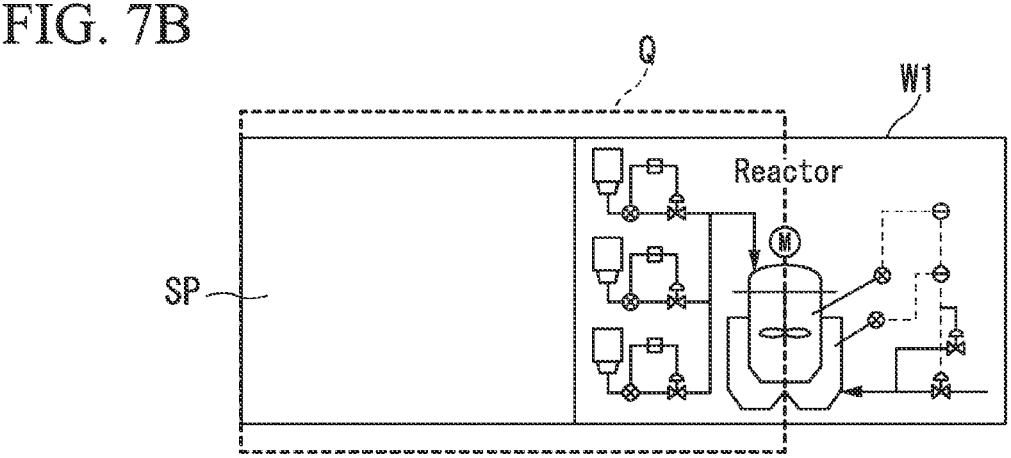
Figure 7C:
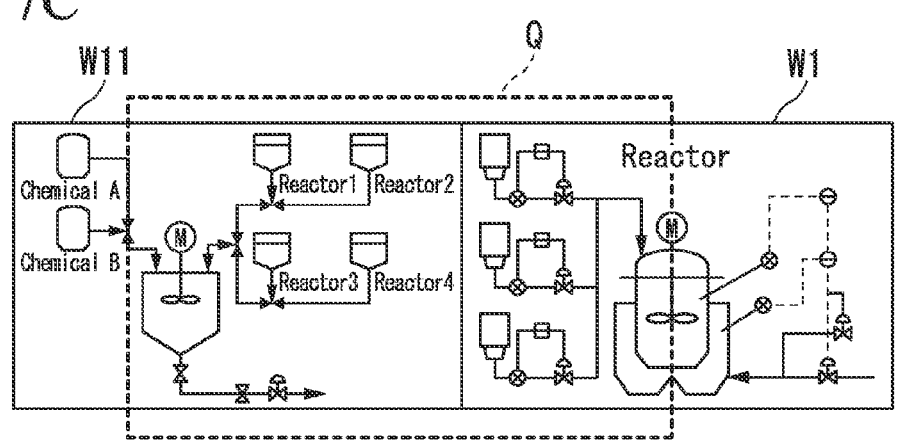

Next, operation of the manipulation monitoring device in the above configuration will be described. FIG. 6 is a flowchart illustrating a process performed in the manipulation monitoring device in accordance with the first preferred embodiment of the present invention. The process of the flowchart shown in FIG. 6 is iteratively performed at certain intervals. FIGS. 7A, 7B and 7C are diagrams illustrating the process performed in the manipulation monitoring device in accordance with the first preferred embodiment of the present invention. In FIGS. 7A, 7B and 7C, a rectangular area indicated by a reference numeral Q indicates a display area of the graphic screen in the display device 12. In an initial state, an entire graphic screen W1 (see FIG. 3) is displayed in the display area Q, as shown in FIG. 7A.

When the process starts, the arithmetic device 16 determines whether the monitoring range has been changed by a manipulation of the operator (step S11). If the determination result is "NO," the determination in step S11 is repeated. On the other hand, for example, if a drag manipulation D in a right direction to slide the graphic screen W1 displayed in the display area Q to the right as shown in FIG. 7A is made by the operator, the determination result in step S11 is "YES" and a detection of the blank space is performed by the blank space detection unit 16*a* (step S12).

If the drag manipulation D in the right direction is made by the operator, the display position of the graphic screen W1 displayed in the display area Q is slid in the right direction of the display area Q as shown in FIG. 7B, and accordingly a blank space SP is created in a left end portion of the display area Q. In step S12, a position or a size of the blank space SP created in the display area Q is detected by the blank space detection unit 16*a*.

If the detection of the blank space SP is performed, the search unit 16*b* determines whether a link object has been designated when the drag manipulation D to drag the graphic screen W1 in the right direction has been made by the operator (step S13). If it is determined that the link object has been designated (if the determination result is "YES"), the search unit 16*b* searches the graphic screen DB 14 using the first search method (step S14). For example, if the screen information of the graphic screen W1 is assumed to be the screen information G1 shown in FIG. 4, screen information of the graphic screen specified by the screen ID "3" is searched for from the graphic screen DB 14 based on the link information stored in the field F14.

On the other hand, if it is determined in step S13 that the link object has not been designated (if the determination result is "NO"), the search unit 16*b* searches the graphic screen DB 14 using the second search method (step S15). For example, if the screen information of the graphic screen W1 is assumed to be the screen information G2 shown in FIG. 4, the search unit 16*b* first acquires the ID list ("V11," "R11" and "T11") stored in the field F13. Next, the search unit 16*b* searches the process configuration DB 15 to obtain respective positions of manipulation monitoring targets (process elements) in the acquired ID list (positions in the logic configuration diagram of the process shown in the frame Z1 in FIG. 3).

Next, the search unit 16*b* searches the process configuration DB 15 again to extract a process element located in a direction (i.e., a left direction in which the blank space SP exists) opposite to the direction in which the drag manipulation D is made for the manipulation monitoring target (process element), the position of which has been obtained in the above process, or connected to the manipulation monitoring target (process element) in the logic configuration diagram of the process. The search unit 16*b* also searches the graphic screen DB 14 to obtain screen information of a graphic screen in which the extracted process element (manipulation monitoring target) is included.

If either of the search processes of steps S14 and S15 ends, the search unit 16*b* determines the number of items of screen information obtained in the search (step S16). If it is determined that the screen information is not obtained (when the number of items is "0"), the process returns to the process in step S11. That is, display content of the display area Q of the display device 12 is not changed from the initial state and the entire graphic screen W1 is displayed in the display area Q, as shown in FIG. 7A.

On the other hand, if it is determined in step S16 that one item of screen information is obtained (when the number of items is "1"), the screen information searched by the search unit 16*b* is sent to the display control unit 16*c*, and composition display of the graphic screen is performed by the display control unit 16*c* (step S17). Specifically, a process is performed by the display control unit 16c to move a display position of the graphic screen W1, the entirety of which is displayed in the display area Q in the initial state, in a direction in which the drag manipulation D has been made and to display a new graphic screen (e.g., the graphic screen W11) in the blank space SP created in the left end portion of the display area Q, as shown in FIG. 7C.

Figure 8:
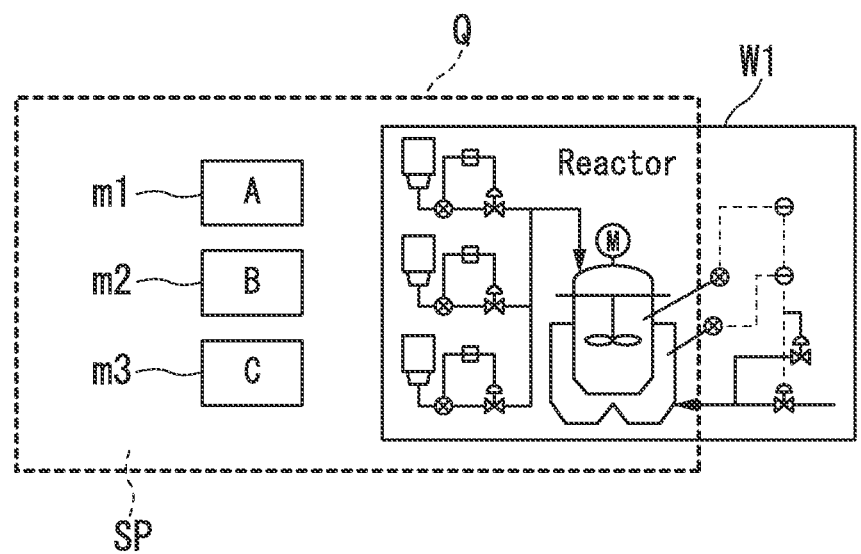
FIG. 8 is a diagram illustrating an example of the selection screen displayed when a plurality of screen information is searched for in accordance with the first preferred embodiment of the present invention.

On the other hand, if it is determined in step S16 that a plurality of screen information is obtained (when the number of items is "2 or more"), all the screen information searched by the search unit 16b is sent to the display control unit 16c, and a selection screen for selecting a graphic screen is displayed on the display area Q by the display control unit 16c, as shown in FIG. 8 (step S18). FIG. 8 is a diagram illustrating an example of the selection screen displayed when a plurality of screen information is searched in accordance with the first preferred embodiment of the present invention.

In the example shown in FIG. 8, the display position of the graphic screen W1, the entirety of which is displayed in the display area Q in the initial state, is moved in the direction in which the drag manipulation D has been made, and selection menus m1 to m3 are displayed in the blank space SP created in the left end portion of the display area Q. Further, the selection menus m1 to m3 are, for example, thumbnails obtained by scaling down the graphic screens W1 to W3 shown in FIG. 3 or names of the graphic screens W1 to W3. If any one of the selection menus m1 to m3 is selected by the operator, the same display as the display shown in FIG. 7C is performed (step S17).

As described above, in the present preferred embodiment, the graphic screen DB 14 is searched based on the relevance information of the process configuration DB 15 to obtain the screen information of a new graphic screen related to the graphic screen displayed on the display device 12, and the new graphic screen is displayed together with the original graphic screen. Accordingly, the operator can easily perform monitoring in consideration of a plurality of processes without performing a complex manipulation.

Figure 9A:
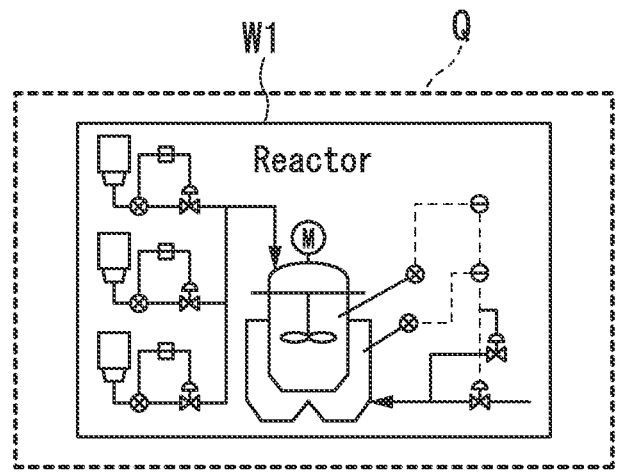
FIGS. 9A and 9B are diagrams for describing a second preferred embodiment of the present invention.
Figure 9B:
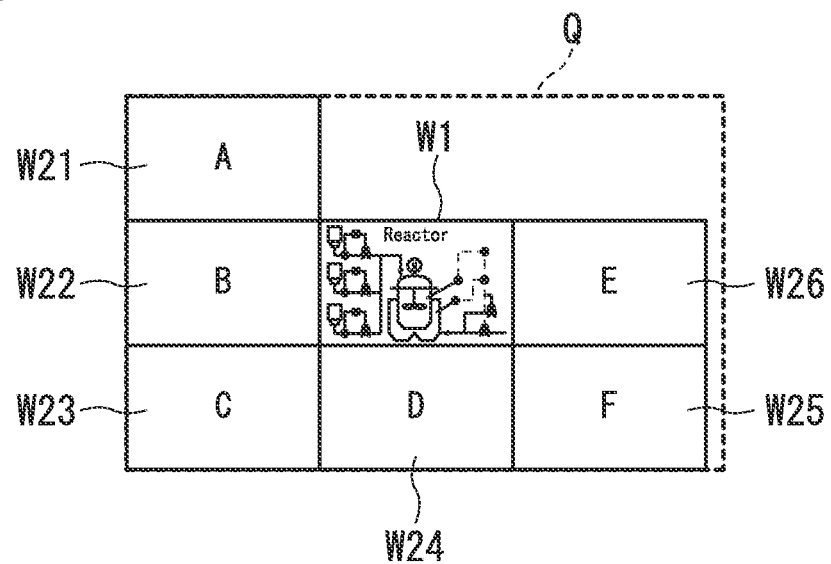

Next, a variant of the first preferred embodiment described above will be described. FIGS. 9A and 9B are diagrams for describing a second preferred embodiment of the present invention. In the first preferred embodiment of the present invention described above, the graphic screen related to the graphic screen W1 is displayed in the blank space created when the graphic screen W1 displayed in the display area Q is slid by a drag manipulation of the operator. On the other hand, in the second preferred embodiment of the present invention, the graphic screen related to the graphic screen W1 is displayed in a blank space created when the graphic screen is scaled down by the manipulation of the operator.

That is, if the operator makes a manipulation to scale down the graphic screen W1 in a state in which the entire graphic screen W1 is displayed in the display area Q as shown in FIG. 9A, a blank space created around the graphic screen W1 is detected by the blank space detection unit 16a. Screen information of a plurality of graphic screens related to the graphic screen W1 is searched for by the search unit 16b, and graphic screens W21 to W25 related to the graphic screen W1 are automatically displayed in the blank space around the scaled-down graphic screen W11, as shown in FIG. 9B. Accordingly, the operator can globally monitor a plurality of processes, thus improving task efficiency.

Figure 10A:
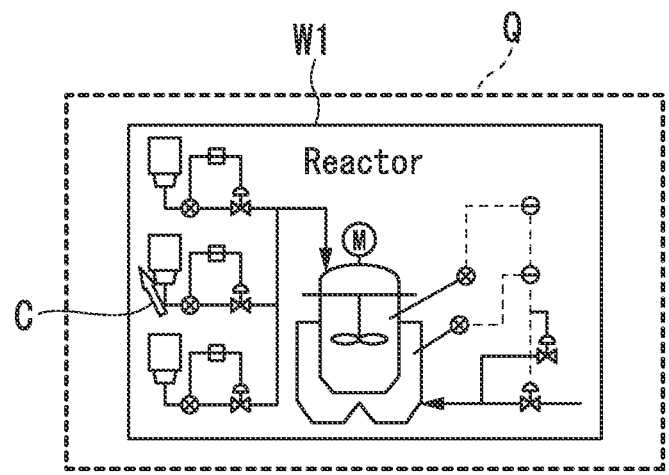
FIGS. 10A and 10B are diagrams for describing a third preferred embodiment of the present invention.
Figure 10B:
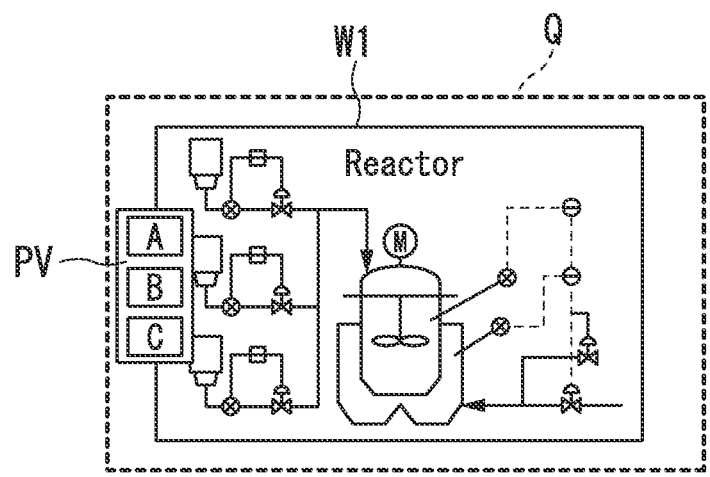

FIGS. 10A and 10B are diagrams for describing a third preferred embodiment of the present invention. In the first preferred embodiment of the present invention described above, the graphic screen related to the graphic screen W1 is displayed in the blank space created due to the movement of the graphic screen W1 displayed in the display area Q. On the other hand, in the third preferred embodiment of the present invention, a preview display of graphic screens related to the graphic screen W1 is performed without moving the graphic screen W1.

That is, if the operator manipulates the input device 11 to move a cursor C to a display position of a link object or an end portion of the display area Q in a state in which the entire graphic screen W1 is displayed in the display area Q as shown in FIG. 10A, a first search process or a second search process is performed by the search unit 16b according to the position of the cursor C. A preview screen PV illustrating thumbnails obtained by scaling down the graphic screens according to the screen information searched by the search unit 16b is displayed. Displaying the preview screen PV without changing the display position of the original graphic screen W1 makes it unnecessary to return display content of the display device 12 to original content when an erroneous manipulation not intended by the operator is made.

Figure 11:
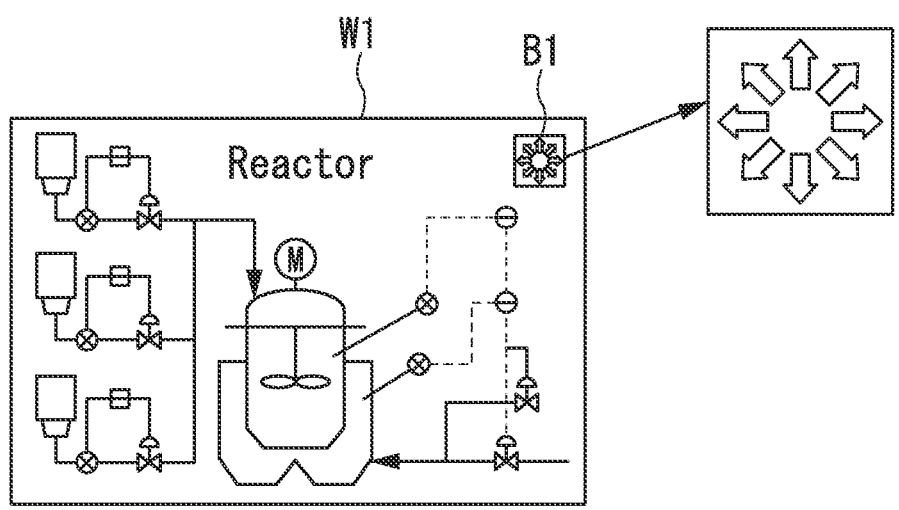
FIG. 11 is a diagram illustrating a button for a screen movement used to change the manipulation monitoring range.

While the manipulation monitoring device and the manipulation monitoring method according to the preferred embodiments of the present invention have been described above, the present invention is not limited to the preferred embodiments described above and may be freely changed without departing from the scope and spirit of the present invention. For example, while an example of a manipulation to change the manipulation monitoring range displayed on the display device 12 includes the drag manipulation in the above preferred embodiment, the manipulation may be a flick manipulation. Further, a button B1 for a screen movement shown in FIG. 11 may be displayed and the manipulation monitoring range may be changed by a click manipulation for the button B1. FIG. 11 is a diagram illustrating a button for a screen movement used to change the manipulation monitoring range. In the button B1 shown in FIG. 11, arrows extending radially in eight directions are provided. When a click manipulation to press the arrow is made, the graphic screen W1 can be moved in a direction indicated by the arrow.

As used herein, the following directional terms "forward, rearward, above, downward, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A manipulation monitoring device comprising:
a first storage unit that stores screen information and identification information, the screen information being of a manipulation monitoring screen prepared for each manipulation monitoring area of a plant, the identification information being related to the screen information, and the identification information being of process elements constituting a process realized in the plant;
a second storage unit that stores relevance information indicating a connection relationship of the process elements;
a display unit that displays the manipulation monitoring screen according to the screen information, which has been stored in the first storage unit, as a first manipulation monitoring screen;
a display control unit that slides the first manipulation monitoring screen in accordance with a manipulation made by an operator, the display control unit creating a blank space in accordance with the slide of the first manipulation monitoring screen; and
a search unit that
acquires the identification information stored in the first storage unit,
obtains, from the relevance information stored in the second storage unit, a position of at least one of the process elements indicated by the identification information acquired by the search unit,
extracts, from the second storage unit, the at least one of the process elements located in the blank space created in accordance with the movement of the first manipulation monitoring screen, based on the position obtained by the search unit, and
obtains, from the first storage unit, the screen information of a graphic screen in which the at least one of the process elements extracted by the search unit is included,
wherein the display control unit performs display control to display a second manipulation monitoring screen in the blank space area on the display unit, the second manipulation monitoring screen being according to the screen information obtained by the search unit.

2. The manipulation monitoring device according to claim 1, further comprising:
an input unit that receives a manipulation instruction for the first manipulation monitoring screen; and
a detection unit that detects the blank space area of the display unit in which the first manipulation monitoring screen becomes undisplayed, based on the manipulation instruction received by the input unit,
wherein the search unit searches the first storage unit based on a detection result from the detection unit, as well as the relevance information, to obtain the screen information related to the first manipulation monitoring screen.

3. The manipulation monitoring device according to claim 2, wherein:
the display control unit performs display control to change a display position of the first manipulation monitoring screen on the display unit based on the manipulation instruction received by the input unit and cause the second manipulation monitoring screen to be displayed in the blank space area on the display unit detected by the detection unit.

4. The manipulation monitoring device according to claim 3, wherein:
if a plurality of screen information related to the first manipulation monitoring screen is obtained by the search unit, then the display control unit performs display control to compose manipulation monitoring screens according to the screen information and cause the composed screen to be displayed as the second manipulation monitoring screen in the blank space area on the display unit.

5. The manipulation monitoring device according to claim 3, wherein:
if a plurality of screen information related to the first manipulation monitoring screen is obtained by the search unit, then the display control unit performs display control to display simple information for the manipulation monitoring screens according to the screen information and cause the manipulation monitoring screen selected by a selection instruction for the simple information to be displayed as the second manipulation monitoring screen in the blank space area on the display unit.

6. The manipulation monitoring device according to claim 1, wherein:
if a plurality of screen information related to the first manipulation monitoring screen is obtained by the search unit, then the display control unit performs display control to compose manipulation monitoring screens according to the screen information and cause the composed screen to be displayed as the second manipulation monitoring screen in the blank space area on the display unit.

7. The manipulation monitoring device according to claim 1, wherein:
if a plurality of screen information related to the first manipulation monitoring screen is obtained by the search unit, then the display control unit performs display control to display simple information for the manipulation monitoring screens according to the screen information and cause the manipulation monitoring screen selected by a selection instruction for the simple information to be displayed as the second manipulation monitoring screen in the blank space area on the display unit.

8. The manipulation monitoring device according to claim 2, wherein:
if a plurality of screen information related to the first manipulation monitoring screen is obtained by the search unit, then the display control unit performs display control to compose manipulation monitoring screens according to the screen information and cause the composed screen to be displayed as the second manipulation monitoring screen in the blank space area on the display unit.

9. The manipulation monitoring device according to claim 2, wherein:
if a plurality of screen information related to the first manipulation monitoring screen is obtained by the search unit, then the display control unit performs display control to display simple information for the manipulation monitoring screens according to the screen information and cause the manipulation monitoring screen selected by a selection instruction for the simple information to be displayed as the second manipulation monitoring screen in the blank space area on the display unit.

10. A manipulation monitoring method of performing control operation and monitoring of a plant, the manipulation monitoring method comprising:
displaying a manipulation monitoring screen according to screen information stored in a first storage unit as a first manipulation monitoring screen on a display unit, the first storage unit storing the screen information and identification information, the identification information being related to the screen information, and the identification information being of process elements constituting a process realized in the plant;
storing, in a second storage unit, relevance information indicating a connection relationship of the process elements;
moving the first manipulation monitoring screen in accordance with a manipulation made by an operator;
creating a blank space in accordance with the of the first manipulation monitoring screen;
acquiring the identification information stored in the first storage unit;
obtaining, from the relevance information stored in the second storage unit, a position of a process element indicated by the acquired identification information;
extracting, from the second storage unit, at least one of the process elements located in the blank space created in accordance with the movement of the first manipulation monitoring screen, based on the obtained position;
obtaining, from the first storage unit, the screen information of a graphic screen in which the at least one of the process elements extracted is included; and
displaying a second manipulation monitoring screen in the blank space area on the display unit, the second manipulation monitoring screen being according to the screen information obtained by the obtaining.

11. The manipulation monitoring method according to claim 10, further comprising:
receiving a manipulation instruction for the first manipulation monitoring screen;
detecting the blank space area of the display unit in which the first manipulation monitoring screen becomes undisplayed, based on the received manipulation instruction; and
searching the first storage unit based on a detection result for the blank space area, as well as the relevance information, to obtain the screen information related to the first manipulation monitoring screen.

12. The manipulation monitoring method according to claim 11, further comprising:
changing a display position of the first manipulation monitoring screen on the display unit based on the manipulation instruction; and
displaying the second manipulation monitoring screen in the blank space area that has been detected.

13. The manipulation monitoring method according to claim 10, further comprising:
composing manipulation monitoring screens according to the screen information to display the composed screen as the second manipulation monitoring screen in the blank space area on the display unit if a plurality of screen information related to the first manipulation monitoring screen is obtained.

14. The manipulation monitoring method according to claim 10, further comprising:
displaying simple information for the manipulation monitoring screens based on the screen information on the display unit and displaying the manipulation monitoring screen selected by a selection instruction for the simple information as the second manipulation monitoring screen in the blank space area on the display unit if a plurality of screen information related to the first manipulation monitoring screen is obtained.

* * * * *